United States Patent
Gorman

[11] Patent Number: 6,127,057
[45] Date of Patent: Oct. 3, 2000

[54] SELF-INERTING FUEL CELL SYSTEM

[75] Inventor: Michael E. Gorman, Glastonbury, Conn.

[73] Assignee: International Fuel Cells, LLC, Hartford, Conn.

[21] Appl. No.: 09/133,768

[22] Filed: Aug. 12, 1998

[51] Int. Cl.[7] .................................................. H01M 08/04

[52] U.S. Cl. ................................ 429/25; 429/17; 429/22; 429/13; 429/38

[58] Field of Search ................................. 429/12, 13, 17, 429/22, 25, 30, 38, 34

[56] References Cited

U.S. PATENT DOCUMENTS

| | | |
|---|---|---|
| 5,441,819 | 8/1995 | Voss et al. ................................. 429/13 |
| 5,503,944 | 4/1996 | Meyer et al. . | 
| 5,935,726 | 8/1999 | Chow et al. ............................... 429/13 |

*Primary Examiner*—Maria Nuzzolillo
*Assistant Examiner*—Raymond Alejandro
*Attorney, Agent, or Firm*—McCormick, Paulding & Huber LLP

[57] ABSTRACT

A self-inerting fuel cell system has a membrane/electrode assembly (MEA). A first fine pore plate is positioned at an anode side of the MEA and defines a fuel reactant flow field and a coolant flow field. A second fine pore plate is positioned at a cathode side of the MEA and defines an oxidant reactant flow field and a coolant flow field. A first means drives the fuel reactant flow field; a second means drives the oxidant flow field, and a third means drives the coolant flow field at a pressure less than that of the pressures of the reactant flow fields during on load operation of the fuel cell system. An air valve is coupled to an inlet or exit port of the oxidant flow field. A controller opens the air valve and activates the reactant and coolant flow fields during fuel cell operation, and closes the air valve and de-activates the reactant and coolant flow fields during fuel cell shut down which results in coolant flooding into the reactant flow fields to thereby inert the fuel cell system during shut down.

23 Claims, 4 Drawing Sheets

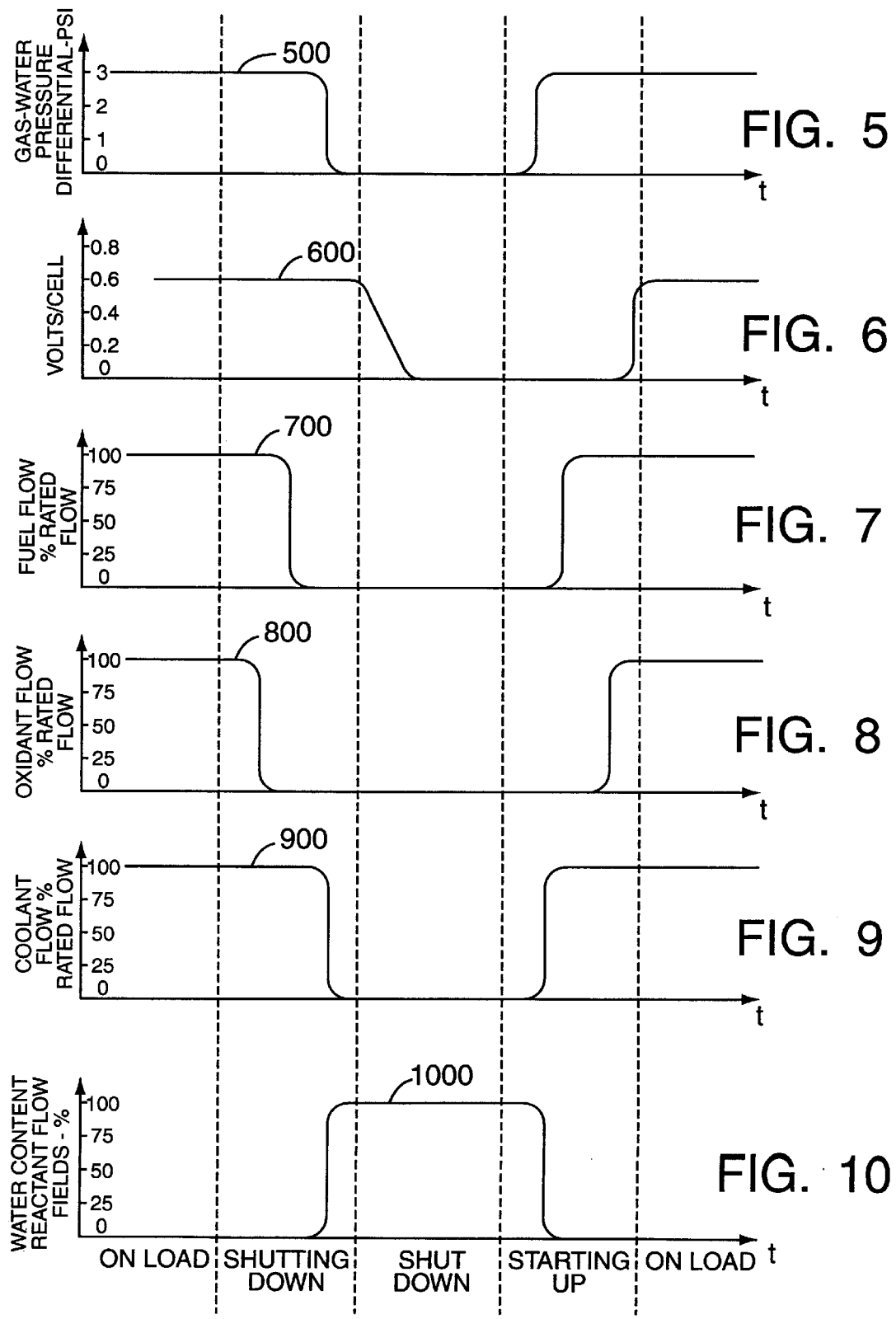

SELF-INERTING FUEL CELL SYSTEM

FIELD OF THE INVENTION

The present invention relates generally to fuel cells, and more particularly to a system and method of inerting a fuel cell.

BACKGROUND OF THE INVENTION

A fuel cell which is in a shut down mode can typically have a dangerously high residual voltage level across its anode and cathode electrodes. In order to reduce the output voltage, the anode and cathode flow fields of the fuel cell are inerted or flooded with an inert gas which, in turn, lowers the output voltage level to about zero volts. One drawback with employing inert gas is the added expense of providing and applying such gas whenever the fuel cell is taken off-line or otherwise shut-down. A second drawback is the operator in charge of fuel cell operation may forget to apply the inerting procedure. If the inerting procedure is overlooked, the reactants will cross-over the membrane separating the anode and cathode electrodes to react with one another to form water. As this reaction progresses, the gaseous volume on the anode side will become depleted and will develop a significant vacuum on the anode side of the system. If the system is not sufficiently leak tight, air from the exterior of the power plant will replace the reacted fuel on the anode side and will represent a hazard to the system when it is again started and fuel reaches the air now occupying the anode gas flow passages. A detonation of this combustible mix may ensue causing damage to the fuel cell system and possibly to people in the vicinity of the fuel cell system.

In response to the foregoing, it is an object of the present invention to provide a self-inerting fuel cell system which overcomes the drawbacks and disadvantages of prior fuel cell systems. Other objects and advantages of this invention will become more readily apparent when the following description is read in conjunction with the accompanying drawings.

SUMMARY OF THE INVENTION

According to one aspect of the present invention, a self-inerting fuel cell system has a membrane/electrode assembly (MEA) provided in its fuel cell stack. A first fine pore plate is positioned at an anode side of the MEA and defines a fuel reactant flow field adjacent to the membrane and a coolant flow field spaced further from the membrane relative to the fuel reactant flow field. A second fine pore plate is positioned at a cathode side of the MEA and defines an oxidant reactant flow field adjacent to the membrane and a coolant flow field spaced further from the membrane relative to the oxidant reactant flow field. A first means drives the fuel reactant flow field at a first pressure; a second means drives the oxidant flow field at a second pressure, and a third means drives the coolant flow field at a third pressure, wherein the third pressure is lower than that of the first and second pressures. A controller activates the flow of reactants and coolant through the reactant and coolant flow fields during fuel cell operation, and de-activates the flow of reactants and coolant through the reactant and coolant flow fields during fuel cell shut down. The pressures of the reactants remaining in the reactant flow fields equalize with the pressure of the coolant remaining in the coolant flow field. The equalization of pressures causes coolant to migrate through the fine pore plates into the reactant flow fields so as to flood the reactant flow fields and displace the reactants, thereby inerting the fuel cell system. Means are provided for preventing the drainage of coolant from the flow fields during fuel cell shutdown.

According to another aspect of the present invention, a method of inerting a fuel cell having a membrane/electrode assembly (MEA) includes providing a first fine pore plate positioned at an anode side of the MEA. The first fine pore plate defines a fuel reactant flow field adjacent to the membrane and a coolant flow field spaced further from the membrane relative to the fuel reactant flow field. A second fine pore plate is positioned at a cathode side of the MEA and defines an oxidant reactant flow field adjacent to the membrane and a coolant flow field spaced further from the membrane relative to the oxidant reactant flow field. The fuel reactant flow field is driven at a first pressure; the oxidant flow field is driven at a second pressure, and the coolant flow field is driven at a third pressure, wherein the third pressure is lower than that of the first and second pressures. The flow of reactants and coolant through the reactant and coolant flow fields are de-activated during fuel cell shut down, whereby reactants remaining in the reactant flow fields upon shut down equalize in pressure with that of the coolant remaining in the coolant flow field. The equalization of pressures causes coolant to migrate through the fine pore plates into the reactant flow fields so as to flood the reactant flow fields and displace the reactants, thereby inerting the fuel cell system.

An advantage of the present invention is that the inerting process is substantially automatic in that the reactant flow fields are flooded generally from the equalization in pressure between the reactant flow fields and the coolant flow fields as a natural consequence of power plant shut down.

Another advantage of the present invention is that flooding the reactant flow fields with coolant or water is a relatively safe procedure. Systems which do not provide a means of inerting the fuel cell system will develop a significant vacuum at least on the anode side of the system because of crossover reaction between the reactants. If the system is not sufficiently leak tight, air from the exterior of the power plant will replace the reacted fuel on the anode side and will represent a hazard to the system when it is again started and fuel reaches the air now occupying the anode reactant fuel flow field. A detonation of this combustible mix may ensue causing damage to the fuel cell system and injury to persons in the vicinity.

BRIEF DESCRIPTION OF THE DRAWINGS

FIG. 5 is a graph illustrating fuel reactant and coolant pressure differentials during various stages of operation and shut down of the fuel cell system of FIG. 1.

FIG. 6 is a graph illustrating volts/cell of the fuel cell power plant of FIG. 1 during various stages of operation and shut down.

FIG. 7 is a graph illustrating the amount of volumetric flow per unit of time of the fuel reactant flow during various stages of fuel cell power plant operation and shut down.

FIG. 8 is a graph illustrating the amount of volumetric flow per unit of time of the oxidant flow during various stages of fuel cell operation and shut down.

FIG. 9 is a graph illustrating the amount of volumetric flow per unit of time of coolant flow during various stages of fuel cell operation and shut down.

FIG. 10 is a graph illustrating the water content in the reactant flow fields during various stages of fuel cell operation and shut down.

DETAILED DESCRIPTION OF THE PREFERRED EMBODIMENT

The fuel cell system to be described herein in accordance with the present invention provides a means for inerting a fuel cell system without using an inert gas during power plant shut down. As will be seen, the fuel cell system is inerted when the fluid in the coolant system floods the anode and cathode flow fields of the cell stack displacing the reactants contained therein. Once the reactants are displaced by the cooling medium, the individual cell voltages approach zero and the stack is safely inerted.

Figure 1:
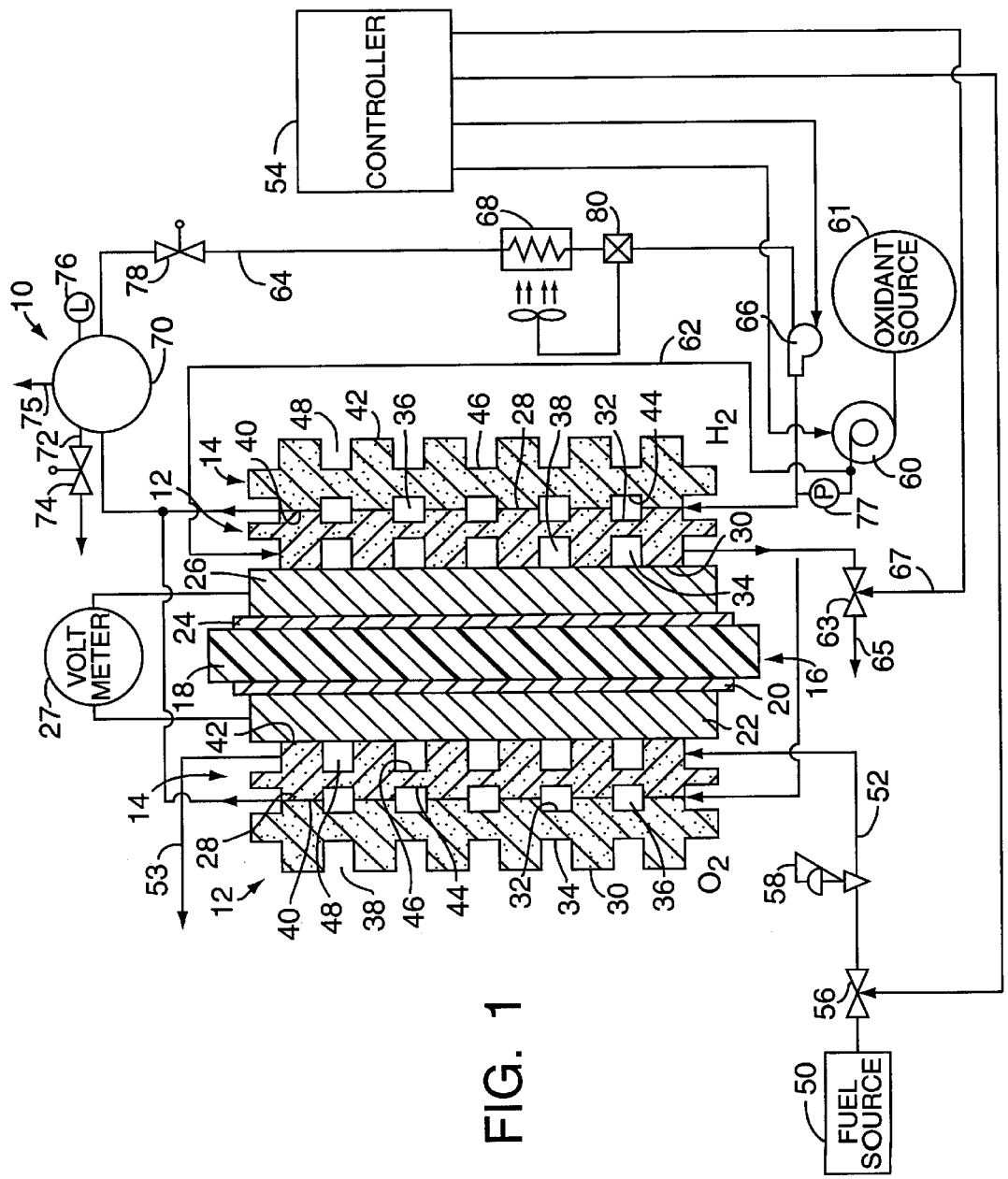
FIG. 1 is a schematic elevational view of one of the cells in a fuel cell power plant in accordance with the present invention.
Figure 2:
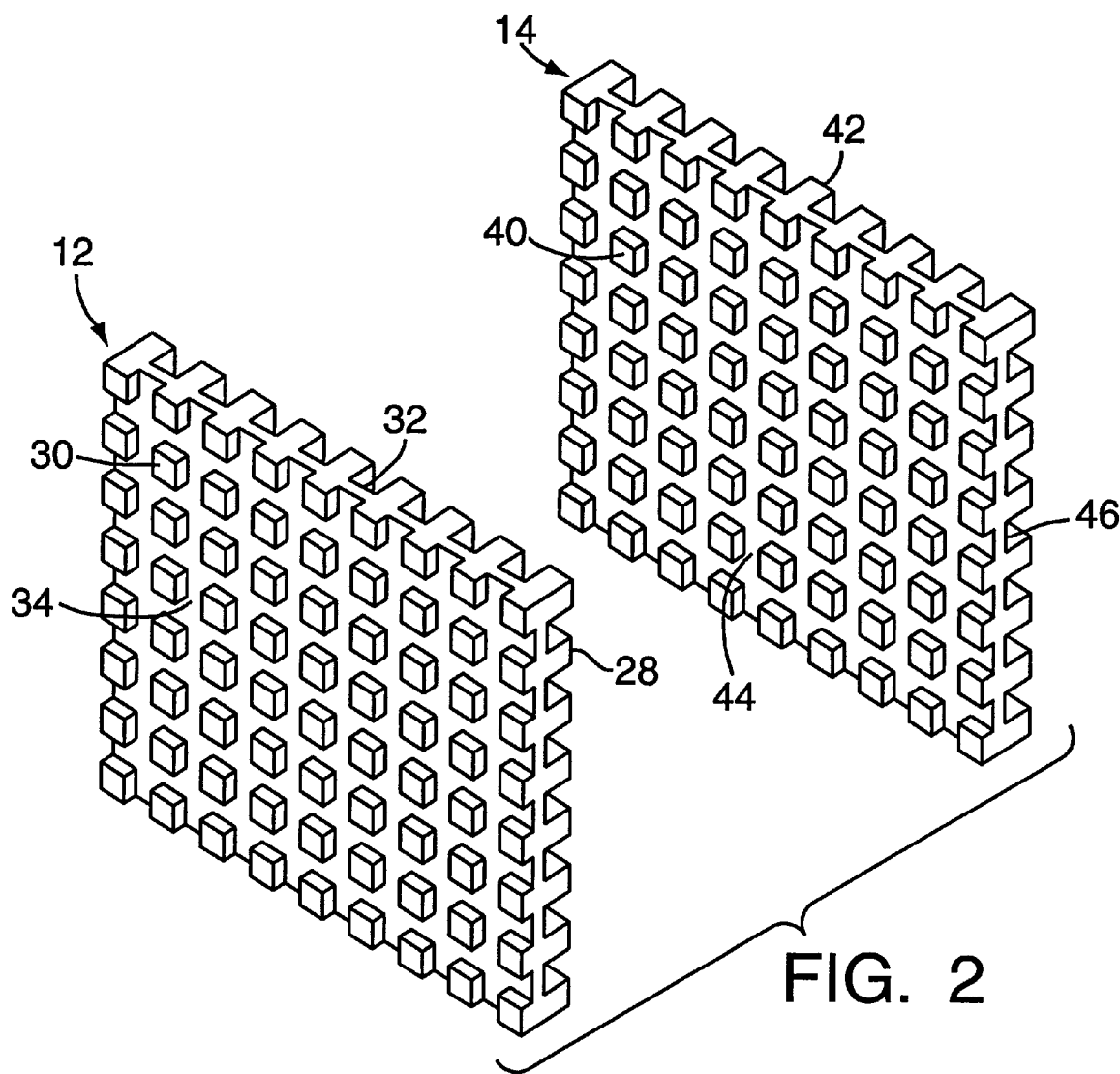
FIG. 2 is an exploded perspective view of two channeled conductor plates used to form reactant and coolant water flow passages in the fuel cell power plant of FIG. 1.

Referring now to FIG. 1, a fuel cell power plant or system in accordance with the present invention is generally designated by the reference number 10. The system 10 shown in FIG. 1 illustrates one cell which is repeated throughout a fuel cell stack. As best shown in FIG. 2, the system 10 includes flow field plates 12 and 14 which are used to form the reactant and coolant or water circulating flow fields. The characteristics and operation of a fuel cell system using such flow field plates is more fully set forth in U.S. Pat. No. 5,503,944 to Meyer et al., the disclosure of which is hereby incorporated by reference. The system 10 has an ion-exchange membrane electrolyte/electrode assembly (MEA) 16 which includes a membrane 18, an anode catalyst layer 20 and an anode substrate 22 on the anode side of the membrane 18, and a cathode catalyst layer 24 and a cathode substrate 26 on the cathode side of the membrane 18. A voltage output across the MEA 16 can be detected or monitored by providing a voltmeter 27 thereacross.

A set of the flow field plates 12 and 14 are provided in back-to-back relationship on each side of the MEA 16. As best shown in FIG. 2, opposite surfaces of the plate 12 are provided with a pattern of projections 28 and 30 which form a network of grooves 32 and 34 on opposite sides of the plate 12. The grooves 32 form a portion of a coolant water flow field 36 in the stack, and the grooves 34 form a cathode or oxidant reactant flow field 38 for each cell of the stack. The plate 14 is also formed with projections 40 and 42, and a network of grooves 44 and 46 on its opposite surfaces. The grooves 44 form a portion of the water coolant flow field 36, and the grooves 46 form an anode or fuel reactant flow field 48 for each cell in the stack. For simplicity of illustration, the cathode and the anode flow fields 38, 48 are shown in FIG. 1 as extending in the same direction, but preferably extend in perpendicular directions relative to each other.

As shown in FIG. 1, the flow field plates 12 and 14 are positioned back-to-back with the projections 28 and 40 being disposed in face-to-face contact. The grooves 32 and 44 combine to form the coolant water flow fields 36 on the anode and cathode sides of the electrolyte membrane 18. The projections 42 abut the anode substrate 22, and the projections 30 abut the cathode substrate 26. The grooves 46 thus form the anode reactant flow field 48, and the grooves 34 form the cathode reactant flow field 38.

Each of the plates 12 and 14 is preferably formed from a porous graphite composite which will provide fine pores on the order of about 1 to 2 microns median diameter. This degree of porosity will promote water migration from an intercellular coolant water flow field to an anode side of the MEA 16 and also away from the cathode side of the MEA 16 and into the next adjacent coolant water flow field. The plates 12, 14 thus provide coolant water on demand to the anode side of the MEA to prevent the latter from drying out, to humidify incoming fuel and oxidant gases, and also to remove water from the cathode side of the MEA 16 to prevent the cathode side from flooding. Each cell in the stack has its own dedicated water coolant flow field 36 and is thus provided with the necessary amounts of water on demand as required by ongoing cell conditions, which may vary from cell to cell in the stack at any particular time, during operation of the stack.

All of the anode reactant flow fields 48 in the power plant 10 are supplied with a hydrogen gas reactant from a pressurized fuel source 50, such as a supply tank. The fuel source 50 may be a fuel processing system, which is well known to those skilled in the pertinent art. The fuel processing system converts an organic fuel such as natural gas or gasoline into a hydrogen rich stream. The hydrogen reactant flows from the supply tank 50 to the anode flow fields 48 through a supply line 52, and the anode exhaust leaving the anode flow fields 48 is directed by an exhaust line 53 to a burner (not shown). The pressure of hydrogen flowing through the supply line 52 is controlled by a controller 54 which controllably adjusts a supply valve 56. The pressure of hydrogen flowing through the supply line 52 may be additionally controlled by a supply regulator 58. The pressure of the anode flow field 48 and the cathode flow field 38 are preferably about the same level. All of the cathode flow fields 38 are supplied with ambient air via an air blower or compressor 60 and an air line 62. The oxygen used in the electrochemical reaction is thus derived from the ambient air. The oxygen may also be supplied to the air blower or compressor 60 from a pressurized oxidant source 61. An air valve 63 may be employed for preventing coolant from draining from the cathode reactant flow field 38 when the reactant flow field is flooded with coolant during power plant shutdown, but may be eliminated (as will be explained below) when employing other means for preventing coolant from draining out of the cathode reactant flow field. The air valve 63, typically employed in a single-pass cathode flow field, has an input coupled to an output port of the cathode flow field 38 and an output coupled to an air exhaust line 65 and is controllably opened and closed by the controller 54 via a control line 67. In addition to controlling the air valve 63, the controller 54 also actuates the air blower or compressor 60.

Coolant water is circulated through the power plant cell units via line 64. The coolant water passes through the coolant flow field or passages 36 between the plates 12 and 14. Circulation of the coolant water is driven by a fixed or variable speed pump 66 which is actuated by the controller 54. The coolant water circulating loop includes a heat exchanger 68 which lowers the temperature of the water exiting from the coolant passages 36, a valve 78, and a water accumulator 70 which includes an overflow drain line 72, a drain valve 74, a vent line 75 and a level sensor 76 for controllably opening and closing the drain valve 74. The accumulator 70 should be positioned above the cell stack assembly, and the water volume held by the accumulator must be sufficient to fill both reactant flow fields as well as reactant manifolds. A pressure transducer 77 communicating with the coolant flow field 36 and the cathode reactant flow field 38 maintains the coolant flow field 36 at a lower pressure than that of the cathode reactant flow field 38 for reasons to be explained below.

During start up of the power plant 10, the coolant water loop 64, 36 is filled with coolant water. The water pump 66 is actuated by the controller 54 so as to create a circulating flow of coolant water. The controller 54 then adjustably opens the valve 56 such that hydrogen reactant is admitted into the anode side of each of the cells in the power plant 10 at a predetermined pressure controlled by the controller 54 and/or the supply regulator 58, and the controller 54 actuates the blower or compressor 60 such that oxygen is admitted into the cathode side of each of the power plant cells. The controller 54 controllably actuates and adjusts the flow of the coolant and reactant flow fields 36, 38, 48 in conjunction with the pressure transducer 77 in order to maintain the coolant flow field 36 at a lower pressure than that of the anode and cathode flow fields 48, 38.

During power plant operation, a portion of the circulating coolant water will migrate through the porous plates 14, into the projections 42 and against the anode side of the membrane 18. Any water which migrates through the membrane 18 from the anode side, as well as product water which is formed on the cathode side of the membrane 18 by the electrochemical reaction, is drawn by the pressure differential between the coolant flow field 36 and the oxidant flow field 38 into the cathode plate projections 30, and passes through the plate 12 into the water coolant flow field 36. Some water will also be evaporated into the oxygen air stream and will vent from the system in the air stream exhaust. The excess product water which is formed in the electrochemical reaction will be pumped into the line 64 along with the coolant water. All of the water in the coolant loop will be cooled in the heat exchanger 68, and excess product water in the loop will pass through a valve 74 and be drained from the accumulator 70. By providing a circulating coolant water supply for each cell in the power plant 10, each cell has an "on-demand" supply of coolant water so that each cell will be able to operate at an optimum temperature, which is preferably between approximately 140° F. to approximately 180° F., so that the coolant remains in its liquid state at near atmospheric operating pressures.

Additionally, local water transport through the fine pore plates 12, 14 adds or removes water from reactant passages to maintain a fully saturated condition at all locations within the cells. With the constant supply of liquid water coolant, any cell which approaches the upper limit of the desired operating temperature range will receive sufficient water at its disposal to bring the cell operating temperature back down to the lower end of the desired operating temperature range. When the cells in the power plant 10 are operating within the approximately 140° F. to approximately 180° F. temperature range, a typical solid polymer electrolyte power plant with one hundred cells, each being one square foot in area and formed in accordance with this invention can produce a power output of about twenty-two kilowatts, i.e., about 0.225 kilowatts per cell. In order to maintain the desired cell operating temperature range, and therefore the power output, the heat exchanger 68 will maintain the temperature of the water emitted therefrom in the range of about 120° F. to about 150° F. To this end, the heat exchanger will preferably be controlled by a thermostat 80 which senses the temperature of the water stream exiting the heat exchanger 68.

During power plant shut down, the controller 54 closes the supply valve 56 to stop the flow of fuel through the anode reactant flow fields 48, deactivates air blower or compressor 60 to stop the flow of air or oxygen through the cathode reactant flow fields 38, and deactivates the pump 66 to stop the flow of coolant through the coolant flow fields 36. In addition, the controller 54 closes the air valve 63 to prevent coolant from draining out of the cathode flow fields 38. Before power plant shut down, the coolant circulating through the coolant flow field 36 was prevented from entering the anode reactant flow field 48 and the cathode reactant flow field 38 by maintaining the respective reactant gases in these fields at a higher pressure than that of the coolant. Upon shut down, however, the pressure levels in the reactant gas flow fields 38, 48 equilibrates with the pressure of the coolant medium which results in coolant migrating through the flow field plates 12, 14 and flooding the reactant flow fields 38, 48 with coolant to displace the reactants remaining in the reactant flow fields 38, 48, and thereby inert the fuel cell system.

Figure 3A:
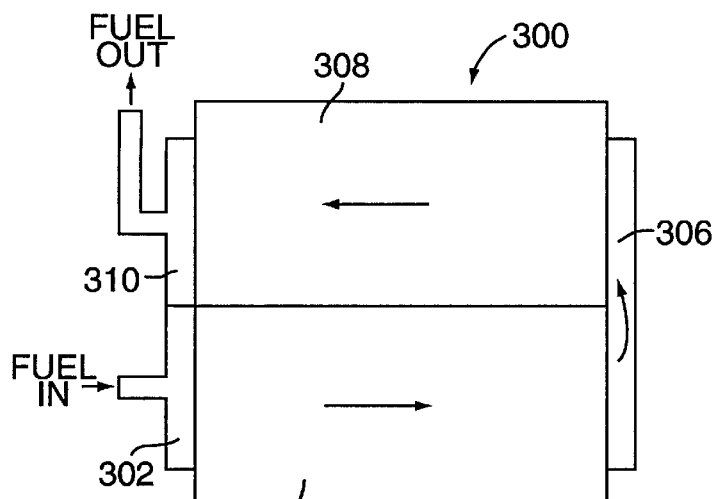
FIG. 3A is a schematic elevational view of a two-pass anode flow field of the fuel cell power plant of FIG. 1.
Figure 3B:
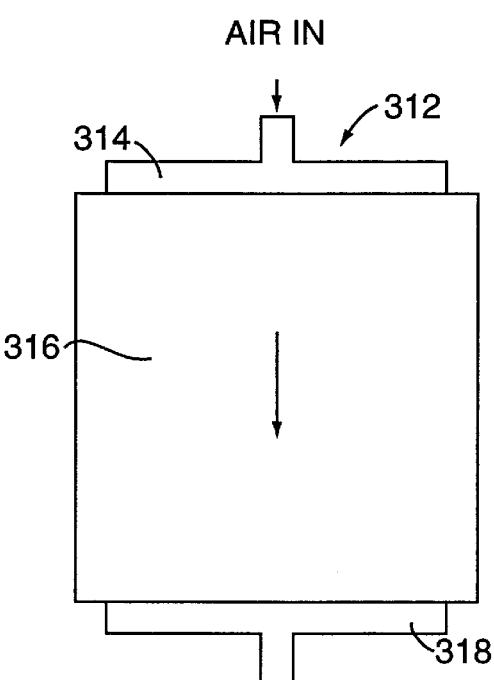
FIG. 3B is a schematic elevational view of a single-pass cathode flow field of the fuel cell power plant of FIG. 1.

The reactant flow fields 38, 48 are shown in FIG. 1 as flowing in the same direction for simplicity of illustration, but are preferably flowing in perpendicular directions relative to each other. The perpendicular directions of the reactant flow fields are schematically illustrated with reference to FIGS. 3A and 3B. FIG. 3A shows a double-pass anode flow field 300 having a fuel inlet manifold 302, a first-pass channel 304, a fuel turn manifold 306, a second-pass fuel channel 308 and a fuel exit manifold 310. As shown in FIG. 3A, the fuel flow is substantially in a horizontal direction (i.e., through the first-pass channel 304 and the second-pass channel 308). FIG. 3B shows a single-pass cathode flow field 312 having an air inlet manifold 314, an airflow channel 316 and an air exit manifold 318. As can be seen in FIG. 3B, the air flow is substantially in a downward vertical direction (i.e., through the single-pass, air flow channel 316, and therefore is oriented in a perpendicular direction relative to the cathode flow field. The air valve 63 is coupled to the air exit manifold 318 to prevent coolant from draining downwardly out of the airflow channel 316 when the cathode flow field 312 is flooded with coolant during power plant shutdown.

Figure 4:
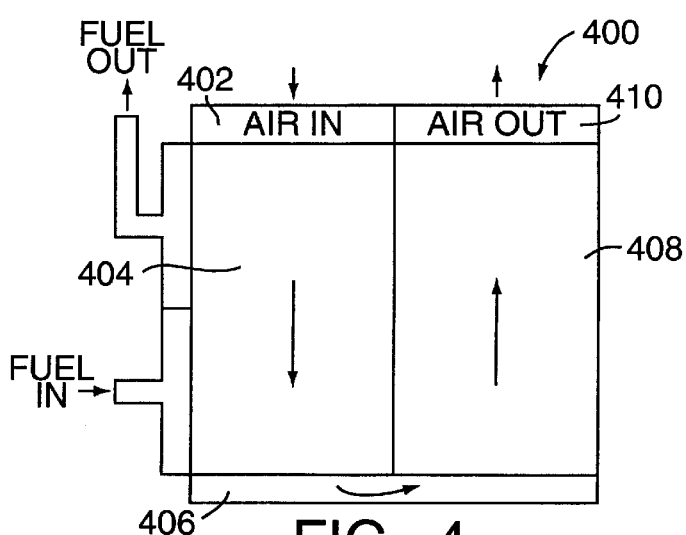
FIG. 4 is a schematic elevational view of a double-pass cathode flow field.

The air valve 63 at the output of the cathode flow field may be eliminated if replaced by other means for preventing coolant from draining from the cathode flow field when the flow field is flooded with coolant during power plant shutdown. With reference to FIG. 4, for example, a double-pass cathode flow field 400 eliminates the need for the air valve 63. (The anode flow field is partially hidden behind the cathode flow field, and is similar to the anode flow field shown in FIG. 3A). The cathode flow field 400 includes an air inlet manifold 402, a first-pass airflow channel 404, an air turn manifold 406, a second-pass airflow channel 408 and an air exit manifold 410. As can be seen in FIG. 4, the air exit manifold 410 is located at the highest portion of the cathode flow field to prevent coolant from draining by means of gravity from the cathode flow field.

FIGS. 5–10 are graphs illustrating power plant characteristics such as flow field pressure, flow and output power relationships of a power plant in accordance with the present invention during various stages of power plant operation and shut down. Specifically, the various stages are: on load (between dashed lines A and B along the abscissas), shutting down (between dashed lines B and C), shut down (between dashed lines C and D), starting up (between dashed lines D and E) and on load (to the right of dashed line E along the abscissas).

FIG. 5 illustrates by means of a curve 500 the difference in pressure between the reactant gases in the reactant flow fields 38, 48 and the water coolant in the coolant flow field 36. The reactant gases in the reactant flow fields 38, 48 are maintained at a pressure of about 3 psi higher than that of the coolant in the coolant flow field 36 when the power plant is fully operational or on load as shown by the curve 500 between the dashed lines A and B. During the period of shutting down or turning off the flow fields of the power plant, as shown between the dashed lines B and C, the pressure difference between the reactants in the reactant flow fields 38, 48 and that of the coolant in the coolant flow field 36 equilibrates or lowers to about zero psi. This zero pressure difference is maintained throughout a period of shut down as shown between the dashed lines C and D. As will be recalled, reduction in pressure difference between the reactants and the coolant in their respective flow fields is a result of the coolant migrating through the flow field plates 12, 14 and flooding the reactant flow fields 38, 48 so as to inert the power plant 10. During a period of starting up of the power plant, as shown between the dashed lines D and E, the pressure difference between the reactants in the reactant flow fields 38, 48 and the coolant in the coolant flow field 36 recovers or rises from about zero psi to about 3 psi and is maintained thereat during on load operation as shown beyond the dashed line E.

FIG. 6 graphically illustrates by means of a curve 600 the change of voltage output of each power plant cell as the power plant is inerted by flooding the reactant flow fields 38, 48 with the coolant from the coolant flow field 36. The voltage output of the power plant 10 is maintained, for example, at about 0.6 volts/cell when the power plant is fully operational or on load as shown by the curve 600 between the dashed lines A and B. During the period of shutting down or turning off the flow fields of the power plant, as shown between the dashed lines B and C, the reactants remaining within the reactant flow fields 38, 48 continue to react with the catalyst and electrolyte which temporarily maintains the voltage output at about 0.6 or higher volts/cell. During shut down as the reactant flow fields 38, 48 are flooded by the coolant from the coolant flow field 36, the power plant is inerted and the voltage output/cell lowers from 0.6 volts to about zero volts/cell, as shown between the dashed lines C and D. During the period of starting up of the power plant, as shown between the dashed lines D and E, the coolant in the reactant flow fields 38, 48 is flushed out and replaced by reactants which results in a resumed electrochemical reaction among the reactants to thereby raise the voltage output of each cell from about zero volts back to about 0.6 volts. During on load operation, as shown beyond the dashed line E, the electrochemical reaction between the fuel and oxidant reactants in the reactant flow fields 38, 48 maintains the voltage output per cell in the power plant 10 at about 0.6 volts.

FIG. 7 graphically illustrates by means of a curve 700 the relationship between an amount of volumetric flow per unit of time of fuel through the fuel reactant flow field 48 as a percentage of the maximum or rated volume of flow during the various stages of power plant operation. During on load operation, as shown by the curve 700 between the dashed lines A and B, the amount of volumetric flow of fuel per unit of time through the anode flow field 48 is at 100% of the rated flow. During shutting down of the power plant, as shown by the curve 700 between the dashed lines B and C, the amount of volumetric flow of fuel sharply lowers from 100% of rated flow to about 0% of the rated flow. As is expected, the fuel reactant in the fuel flow field 48 does not flow and is therefore maintained at about 0% of rated flow during shut down as shown between the dashed lines C and D. During starting up of the power plant, as shown by the curve 700 between the dashed lines D and E, the fuel flow in the anode reactant flow field 48 quickly rises from 0% of rated flow to about 100% of rated flow and is maintained thereat during on load operation as shown by the curve 700 beyond the dashed line E.

FIG. 8 graphically illustrates by means of a curve 800 the relationship between amount of volumetric flow per unit of time of oxidant reactant, such as oxygen or air, through the oxidant reactant flow field 38 as a percentage of the maximum or rated volume of flow during the various stages of power plant operation. As can be seen by comparing FIGS. 7 and 8, the flow characteristics of the cathode reactant in the cathode flow field 38 are generally similar to that of the flow characteristics of the fuel reactant in the anode flow field 48. However, the oxidant flow lowers from 100% of its rated flow to about 0% of its rated flow slightly earlier during shutting down of the power plant, as shown by the curve 800 between the dashed lines B and C, as compared with the fuel flow during this period as shown by the curve 700 in FIG. 7. Further, the oxidant flow recovers from 0% of its rated flow to about 100% of its rated flow slightly later during starting up of the power plant, as shown by the curve 800 between the dashed lines D and E, as compared with the fuel flow during this period as shown by the curve 700 in FIG. 7.

FIG. 9 graphically illustrates by means of a curve 900 the relationship between an amount of volumetric flow per unit of time of coolant through the coolant flow field 36 as a percentage of the maximum or rated volume of flow during the various stages of power plant operation. As can be seen by comparing FIGS. 7–9, the flow characteristics of the coolant in the coolant flow field 36 is generally similar to that of the flow characteristics of the reactants in the reactant flow fields 38, 48.

FIG. 10 graphically illustrates by means of a curve 1000 the relationship between water or coolant content in the reactant flow fields 38, 48 during the various stages of power plant operation and shut down. During on load operation of the power plant, as shown by the curve 1000 between the dashed lines A and B, the volumetric content of coolant is about zero percent of a maximum capacity that can be held in the reactant flow fields 38, 48. Maintaining the pressure in the coolant flow field 36 below that of the reactant flow fields 38, 48 during on load operation prevents coolant from substantially flowing through the flow field plates 12, 14 from the coolant flow field 36 into the reactant flow fields 38, 48. Preventing the coolant from flooding the reactant flow fields is obviously important in permitting the reactants to react with one another to generate an output voltage across the MEA 16. During the shutting down of the power plant, as shown by the curve 1000 between the dashed lines B and C, the water content in the reactant flow fields 38, 48 sharply rises from 0% to about 100% of maximum capacity as the pressure difference between the reactant flow fields and the coolant flow field drops to about zero psi, which in turn permits the coolant to flow through the flow field plates 12, 14 into the reactant flow fields and to thereby flood the reactant flow fields and consequently inert the power plant. As is expected, during shut down when the power plant is inerted, as shown by the curve 1000 between the dashed lines C and D, the reactant flow fields 38, 48 remain flooded (i.e., the coolant remains at about 100% of reactant flow field capacity). During the starting up period of the power plant, as shown by the curve 1000 between the dashed lines D and E, the water content in the reactant flow fields 38, 48 quickly lowers to about zero percent of reactant flow field capacity as the water is flushed out and replaced by the reactants. The higher pressures of the reactant flow fields relative to that of the coolant flow field prevent water from migrating through the flow field plates 12, 14 and flooding the reactant flow fields during on load operation of the power plant, as shown by the curve 1000 beyond the dashed line E.

The benefit of an inerted fuel cell system as described in accordance with the present invention is that the voltage potential across the cell electrodes is removed in order to protect anyone servicing the fuel cell system. Additionally, systems that do not provide a means of inerting the fuel cell system will develop a significant vacuum on the anode side of the system because of the crossover reaction between the reactants. If the system is not sufficiently leak tight, air from the exterior of the power plant will replace the reacted fuel on the anode side and will represent a hazard to the system when it is again started and fuel reaches the air now occupying the anode gas flow passages. A detonation of this combustible mix may ensue causing damage to the fuel cell system. A further benefit is that the fuel cell system of the present invention is generally self-inerting. In other words, the pressure equalization among the reactant and coolant flow fields which naturally follow upon shut down causes the coolant to migrate through the flow field plates 12, 14 into the reactant flow fields to inert the system. Consequently, the danger to an operator in forgetting to flood the reactant flow fields with an inert gas, as is done in conventional inerting procedures, is removed.

Although this invention has been shown and described with respect to an exemplary embodiment thereof, it should be understood by those skilled in the art that the foregoing and various other changes, omissions, and additions in the form and detail thereof may be made therein without departing from the spirit and scope of the invention. For example, the reactant and coolant flow fields may have different orientations and may have any desired number of passes. Further, the sequence of activating the coolant and reactant flow fields may be varied. Accordingly, the preceding portion of this specification is to be taken in an illustrative, as opposed to a limiting sense.

What is claimed is:

1. A fuel cell system having a membrane/electrode assembly, MEA, the fuel cell system comprising:
   a first fine pore plate positioned at an anode side of the MEA and defining a fuel reactant flow field adjacent to of the MEA and a coolant flow field spaced further from the MEA membrane relative to the fuel reactant flow field;
   a second fine pore plate positioned at a cathode side of the MEA and defining an oxidant reactant flow field adjacent to the MEA and a coolant flow field spaced further from the MEA relative to the oxidant reactant flow field;
   first means for driving the fuel reactant flow at a first pressure during on load operation of the fuel cell system;
   second means for driving the oxidant reactant flow at a second pressure during on load operation of the fuel cell system;
   third means for driving the coolant flow at a third pressure during on load operation of the fuel cell system, the third pressure being lower than that of the first and second pressures;
   a controller for activating the reactant flows and the coolant flow during fuel cell operation such that the reactant flows are maintained at higher pressure levels relative to the coolant flow, and de-activating the reactant and coolant flow during fuel cell shut down, whereby pressure levels of reactants remaining in the reactant flow fields equilibrates with a pressure level of coolant remaining in the coolant flow field during fuel cell shutdown causing the coolant to migrate through the fine pore plates and flood the reactant flow fields, displace the reactants, and in turn, inert the fuel cell system.

2. A fuel cell system as defined in claim 1, wherein the first means is a pressurized fuel source.

3. A fuel cell system as defined in claim 1, wherein the first means is a fuel processing system.

4. A fuel cell system as defined in claim 1, wherein the second means is one of an air blower and compressor.

5. A fuel cell system as defined in claim 1, wherein the second means is a pressurized oxidant source.

6. A fuel cell system as defined in claim 1, wherein the third means is a water pump.

7. A fuel cell system as defined in claim 1, wherein the oxidant flow field is a single-pass flow field.

8. A fuel cell system as defined in claim 1, wherein the oxidant flow field is a single-pass flow field for directing oxidant in a generally downward direction, and further including an air valve at an output of the oxidant reactant flow field, the air valve coupled to the controller for being closed during power plant shutdown in order to prevent coolant from draining out of the oxidant reactant flow field.

9. A fuel cell system as defined in claim 1, wherein the oxidant reactant flow field is a double-pass flow field, a first-pass of the oxidant reactant flow field for directing oxidant in a generally downward direction, and a second-pass of the oxidant reactant flow field for directing oxidant in a generally upward direction.

10. A fuel cell system as defined in claim 1, wherein the fuel reactant flow field is a double-pass flow field and each pass of the fuel reactant flow field generally extending in a perpendicular direction relative to the oxidant reactant flow field.

11. A fuel cell system as defined in claim 1, wherein the first and second fine pore plates each include first and second plate members, each plate member including a pattern of projections and grooves, the projections of the first and second plate members abutting one another such that the projections and grooves of the first and second plate members cooperate to form reactant and coolant flow field channels.

12. A fuel cell system as defined in claim 1, further including a coolant accumulator communicating with the coolant flow field, and positioned above the MEA of the fuel cell system.

13. A method of inerting a fuel cell having a membrane/electrode assembly, MEA, the method comprising the steps of:
   providing a first fine pore plate positioned at an anode side of the MEA and defining a fuel reactant flow field adjacent to the MEA and a coolant flow field spaced further from the MEA relative to the fuel reactant flow field;
   providing a second fine pore plate positioned at a cathode side of the MEA and defining an oxidant reactant flow field adjacent to the MEA and a coolant flow field spaced further from the membrane relative to the oxidant reactant flow field;
   driving the fuel reactant flow at a first pressure during on load operation of the fuel cell system;
   driving the oxidant reactant flow at a second pressure during on load operation of the fuel cell system;
   driving the coolant flow at a third pressure during on load operation of the fuel cell system, the third pressure being lower than that of the first and second pressures;

activating the reactant and coolant flows during on load operation of the fuel cell system such that the reactants are maintained at higher pressure levels relative to the coolant; and de-activating the reactant flow and the coolant flow during fuel cell shut down, whereby pressure levels of reactants remaining in the reactant flow fields equilibrates with a pressure level of coolant remaining in the coolant flow field during fuel cell shutdown causing the coolant to migrate through the fine pore plates and flood the reactant flow fields, displace the reactants, and in turn, inert the fuel cell system.

14. A method of inerting a fuel cell as defined in claim 13, wherein the step of driving the fuel reactant flow field includes providing a pressurized fuel source.

15. A method of inerting a fuel cell as defined in claim 13, wherein the step of driving the fuel reactant flow field includes providing a fuel processing system.

16. A method of inerting a fuel cell as defined in claim 13, wherein the step of driving the oxidant reactant flow field includes providing one of an air blower and compressor.

17. A method of inerting a fuel cell as defined in claim 13, wherein the step of driving the oxidant reactant flow field includes providing a pressurized oxidant source.

18. A method of inerting a fuel cell as defined in claim 13, wherein the step of driving the cool ant flow field includes providing a water pump.

19. A method of inerting a fuel cell system as defined in claim 13, wherein the step of driving the fuel reactant flow field includes directing the fuel reactant along a two-pass fuel flow channel.

20. A method of inerting a fuel cell as defined in claim 13, wherein the step of driving the oxidant reactant flow field includes directing the oxidant reactant along a single-pass oxidant flow channel.

21. A method of inerting a fuel cell as defined in claim 13, wherein the step of driving the oxidant reactant flow field includes directing the oxidant reactant generally downwardly along a single-pass oxidant flow channel, and the step of deactivating includes closing an output of the oxidant flow channel to prevent coolant from draining out of the oxidant flow channel during power plant shutdown.

22. A method of inerting a fuel cell as defined in claim 13, wherein the step of driving the oxidant reactant flow field includes directing the oxidant reactant generally downwardly and then upwardly along a double-pass oxidant flow channel.

23. A method of inerting a fuel cell as defined in claim 13, further including the step of providing an accumulator positioned above the MEA.

* * * * *

UNITED STATES PATENT AND TRADEMARK OFFICE
CERTIFICATE OF CORRECTION

PATENT NO. : 6,127,057
DATED : October 3, 2000
INVENTOR(S) : Michael E. Gorman

It is certified that error appears in the above-identified patent and that said Letters Patent is hereby corrected as shown below:

Claim 18, line 2, after "the" (second occurrence), please delete "cool ant" and insert --coolant--.

Signed and Sealed this

Eighth Day of May, 2001

Attest:

NICHOLAS P. GODICI

Attesting Officer

Acting Director of the United States Patent and Trademark Office